(12) United States Patent
Tripathy

(10) Patent No.: US 10,800,870 B2
(45) Date of Patent: Oct. 13, 2020

(54) ALIPHATIC/AROMATIC OLEFIN BLOCK COPOLYMERS

(71) Applicant: ExxonMobil Chemical Patents Inc., Baytown, TX (US)

(72) Inventor: Ranjan Tripathy, Sugar Land, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 9 days.

(21) Appl. No.: 15/846,361

(22) Filed: Dec. 19, 2017

(65) Prior Publication Data

US 2018/0179316 A1 Jun. 28, 2018

Related U.S. Application Data

(60) Provisional application No. 62/437,992, filed on Dec. 22, 2016.

(51) Int. Cl.
*C08F 297/00* (2006.01)
*C09J 153/00* (2006.01)
*C08L 53/00* (2006.01)
*B32B 27/32* (2006.01)

(52) U.S. Cl.
CPC .......... *C08F 297/00* (2013.01); *B32B 27/325* (2013.01); *C08L 53/00* (2013.01); *C09J 153/00* (2013.01); *C08L 2205/025* (2013.01)

(58) Field of Classification Search
CPC ....... C08F 297/04; C08F 297/08; C08L 91/00
See application file for complete search history.

(56) References Cited

U.S. PATENT DOCUMENTS 2,317,859 A 4/1943 Soday
4,287,042 A * 9/1981 Ebdon ................ G01N 27/3335
204/296

(Continued)

FOREIGN PATENT DOCUMENTS

EP 0 183 448 A 6/1986
EP 0 879 863 B 11/1998

(Continued)

OTHER PUBLICATIONS

Gillard et al., "Determination of the Lamellae-to-Disorder Heat of Transition in a Short Diblock Copolymer by Relaxation Calorimetry", Macromolecules, 2015, vol. 48, Issue 13, pp. 4733-4741.
Hillmyer et al., Model Bicontinuous Microemulsions in Ternary Homopolymer/Block Copolymer Blends, J. Phys. Chem. B., 1999, vol. 103, pp. 4814-4824.

(Continued)

*Primary Examiner* — Mark S Kaucher

(57) ABSTRACT

Disclosed herein are copolymers comprising at least one block comprising C8-C12 olefin-derived units, at least one block comprising C4-C6 olefin-derived units, and at least one block comprising C5/C10 olefin-derived units, wherein each block has a number average molecular weight of at least 300 g/mole and two glass transition temperatures (Tg). The olefin block copolymers are formed by combining a first olefin with a catalyst at least a first stage to form a first olefin block, and combining a second olefin with the same or different catalyst in at least a separate stage to form a second block. The copolymers are useful as tackifiers in adhesive compositions and in films.

20 Claims, 8 Drawing Sheets

(56) References Cited

U.S. PATENT DOCUMENTS

| | | | | |
|---|---|---|---|---|
| 4,631,314 A | * | 12/1986 | Tung | C08F 297/04 |
| | | | | 525/250 |
| 4,757,114 A | * | 7/1988 | Tochinai | C08F 240/00 |
| | | | | 524/499 |
| 6,031,053 A | * | 2/2000 | Knoll | C08F 297/04 |
| | | | | 525/314 |
| 2004/0077795 A1 | * | 4/2004 | Hashizume | C08F 8/04 |
| | | | | 525/338 |

FOREIGN PATENT DOCUMENTS

| | | |
|---|---|---|
| WO | 98/5799 A | 12/1998 |
| WO | 98/57999 A | 12/1998 |

OTHER PUBLICATIONS

Lucas et al., "The 2D-J-DOSY Experiment: Resolving Diffusion Coefficients in Mixtures", Journal of Magnetic Resonance, vol. 156, Issue 1, 2002, pp. 138-145.

Morris et al., "Analysis of Mixtures Based on Molecular Size and Hydrophobicity by Means of Diffusion-Ordered 2D NMR", Analytical Chemistry, vol. 66, No. 2, 1994, pp. 211-215.

Sangdoo Ahn et al., "Diffusion-Ordered NMR Spectroscopy of Poly([ethylene-co-vinyl acetate]-graft-vinyl chloride) in Solution", Bull. Korean Chem. Soc., 2005, vol. 26, No. 2, pp. 331-333.

Ren, L. et al. "Anionic polymerization of 1,3-pentadiene in toluene: homopolymer, alternating and block copolymers", Royal Soc. Chem., vol. 6, pp. 51533-51543, 2016.

* cited by examiner

ALIPHATIC/AROMATIC OLEFIN BLOCK COPOLYMERS

PRIORITY CLAIM

This application claims the benefit of Provisional Application No. 62/437,992, filed Dec. 22, 2016, the disclosure of which is incorporated herein by its reference.

FIELD OF THE INVENTION

The present invention relates to olefin-based block copolymers including at least an aliphatic C4-C6 olefin block, at least one aromatic C8-C12 olefin block, and/or at least one cyclic C5/C10 olefin block.

BACKGROUND OF THE INVENTION

A block copolymer is a polymer consisting of multiple sequences, or blocks, of the same or similar monomers alternating in series with other distinct monomer blocks. The blocks are covalently bound to each other, such as an AAABBBAAA fashion (A and B are different types of monomers and the series of each are "blocks"). The importance of block copolymers comes in part from their wide array of properties made possible by the existence of distinct blocks in one polymer.

A major use of block copolymers is in industrial melt-adhesives. Styrenic block copolymers fill such a role. By combining blocks that exhibit rubber-like properties on the one hand and adhesive-like properties on the other, useful heat-activated compositions can be formed. When heat is applied, the polystyrene parts melt and allow for limited liquid-like flow. The middle aliphatic section causes adhesion and after the temperature drops the strength of polystyrene is restored. This property, enhanced by the combination of the base block copolymer with other polymers, makes this styrenic block copolymers useful adhesives.

In order to tailor the properties of styrenic block copolymers to particular adhesive uses, other components such as tackifiers are typically used. "Tackifiers" are chemical compounds used in formulating adhesives to increase the tack, or the stickiness of the surface of the adhesive. Currently, most tackifiers are either random hydrocarbon and/or phenolic resins or synthetic random copolymers. Being random copolymers, such compounds will typically partition in the styrenic block copolymer base, and hence modify either the aliphatic or aromatic portion of the styrenic block copolymer base. Such partitioning requires the use of multiple tackifiers. It would be useful to have a tackifier that can modify the properties of both blocks of the base polymer.

Typically, tackifiers are made from purified aromatic monomers selected to produce a resin with an unusually high glass transition temperature and softening point. Due to these unique properties, such resins are especially suited for use as modifiers for the end-blocks of styrenic block copolymers. Resins with higher glass transition temperature and softening point than that of styrene reinforce compounds based on block copolymers, giving them higher cohesive strength and resistance to high temperatures. However, such resins associate only with the non-elastic styrenic portions of a block copolymer (i.e., they normally do not impart tack properties). Hence, there is a need for a tackifier which can modify the end block improving cohesive strength at high temperature at the same time improving tack.

This tackifying ability would also be useful in multilayered films, where both adhesion and flexibility are desired. For instance, multilayer film technology allows two or more polymers to be combined in a layered structure to give a wide range of desirable properties. Depending on the application, the number of layers can range from two to hundreds. Packaging materials, for example, typically include 3 to 7 layers of polymer material. Each layer serves a different function, such as providing mechanical strength, permeation barrier, or surface wettability. The problem with such multiple layers is that the process to make such films, typically coextrusion where high shear stress is experienced by the polymer melt, often results in films having poor adhesion between the immiscible polymer layers. An additive that could affect both polymer layers of the film and improve adhesion would be desirable.

U.S. Pat. No. 2,317,859 disclose a process for preparing a resin suitable for liquid coating and molding by polymerizing styrene with a piperylene component that has been previously partially polymerized catalytically using acid-acting metallic halide catalyst.

EP 0183448 B1 describes a process for preparing block copolymer petroleum resins useful for hot melt pressure sensitive adhesives. Specifically, it describes a process of preparing resin from a reaction mixture using a feed of C4 or C5 that is polymerized completely in the presence of a Friedel-Crafts catalyst and adding a feed of C8 or C9 to the reaction mixture for further polymerization, to form a tackifier with a single softening point (i.e., single Tg).

Hence, there is a need for an olefin block copolymer which is capable of forming domains at the molecular level. Inventive tackifiers with two distinct glass transition temperatures ($T_g$), also referred to herein as a dual $T_g$ tackifier, comprising aliphatic and aromatic domains would improve chain entanglement at interfaces, thereby improving adhesion between components of an adhesive or layers in a multilayer film. The dual $T_g$ tackifier would also improve cohesive strength at high temperature at the same time improving tack.

References of interest include:
Ren, L.; Liu, K.; He, Q.; Ou, E.; Lu, Y.; and Xu, W., 6 ROYAL SOC. CHEM. 51533-51543 (2016).
Gillard, T. M.; Phelan, D.; Leighton, C.; Bates, F. S., 48(13) MACROMOLECULES 4733-4741 (2015).
Hillmyer, M. A.; Maurer, W. W; Lodge, T. P.; Bates, F. S., 103 J. PHYS. CHEM. B 4814-4824 (1999).
Morris, K. F.; Stilbs, P.; Johnson Jr, C. S., 66(2) ANAL. CHEM. 211-215 (1994).
Lucasa, L. H.; Ottoa, W. H.; Lariveb, C. K., 156(1) J. OF MAGNETIC RESONANCE 138-145 (2002).
Sagdon, A.; Kim, E-H; Lee, C., 26(2) BULL. KOREAN CHEM. SOC. 331 (2005).

SUMMARY OF THE INVENTION

Disclosed herein is an olefin block copolymer comprising at least one block comprising C8-C12 olefin-derived units and at least one block comprising C4-C6 olefin-derived units and/or C5/C10 cyclic, wherein each block has a number average molecular weight of at least 300 g/mole, and the copolymer has two glass transition temperatures ($T_g$) and an Mw/Mn value of at least 1.5.

Also disclosed is a method of forming the olefin block copolymer comprising combining C8-C12 olefins with a catalyst at least a first stage to form a C8-C12 olefin block, and combining C4-C6 olefins with the same or different catalyst in at least a second stage to form a C4-C6 olefin block; wherein the second stage takes place in the presence of the C8-C12 olefin block, or the first stage takes place in the presence of the C4-C6 olefin block.

The current invention also describes a method for producing a dual $T_g$ tackifier (i.e., a tackifier having two distinct $T_g$), by combining a first olefin with a catalyst at least a first stage to form a first olefin block, and combining a second olefin with the same or different catalyst in at least a second stage to form a second olefin block.

DETAILED DESCRIPTION

Figure 1:
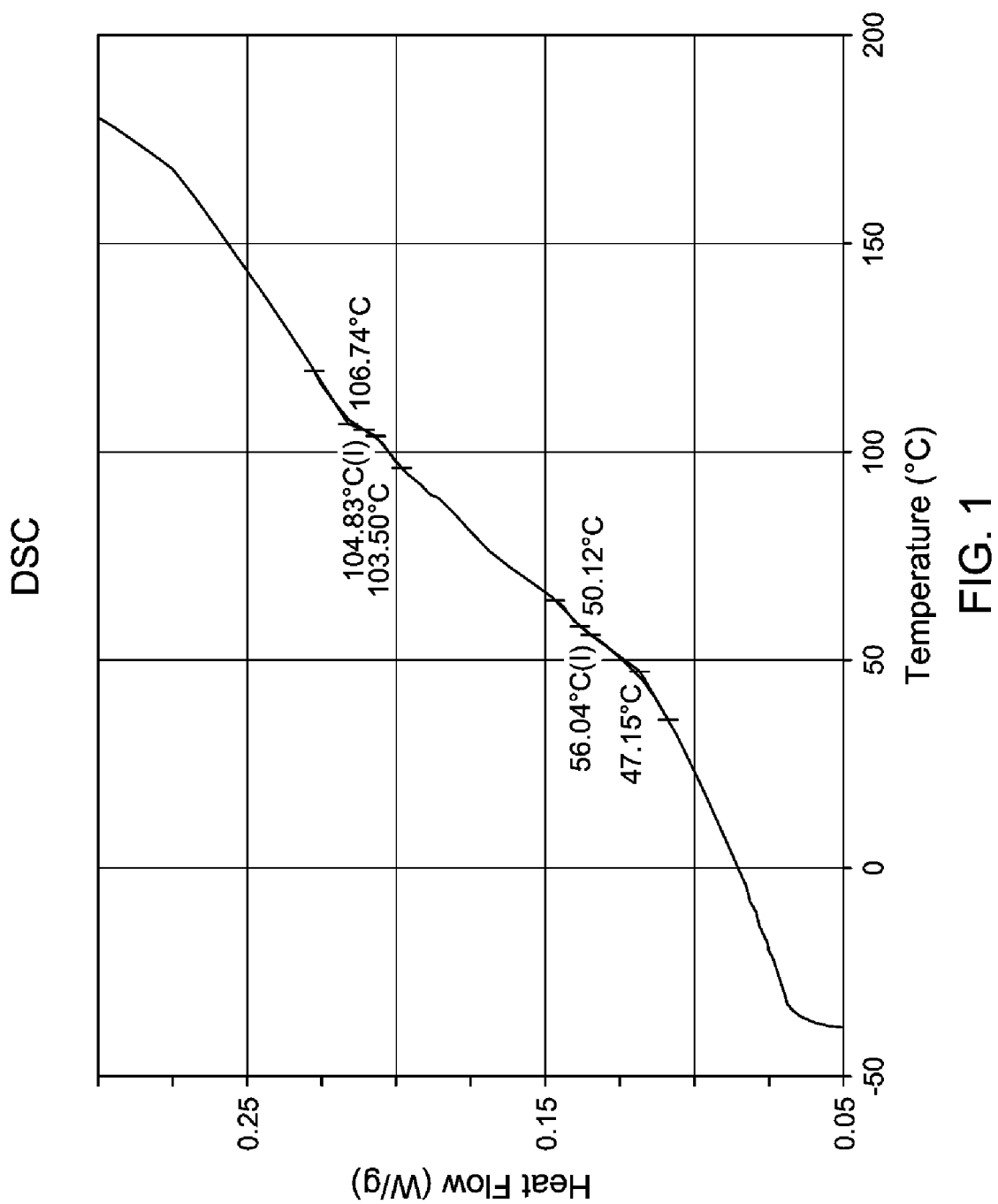
FIG. 1 is a DSC trace of the inventive olefin block copolymer exemplified in Example 1 where the onset, inflection point (I), and end point temperatures are indicated, where the (I) is the $T_g$.

Disclosed herein is an olefin block copolymer useful in adhesives, films, and other applications. The inventive olefin block copolymers described herein comprise monomers derived from the so-called C5 stream, C5/C10 cyclic stream and C9 stream of common hydrocarbon cracking processes. The "C5 stream" comprises C4 to C6 olefins and/or diolefins, and mostly comprises piperylene, and the "C9 stream" comprises C8 to C12 hydrocarbons containing at least one aromatic moiety, mostly comprising indene, vinyltoluene, and styrene. The "C5/C10 cyclic stream" comprises olefins and/or diolefins and mostly cyclopentadiene, dicyclopentadiene, or derivatives thereof. Random C5/C9 olefin copolymers are known and prepared by polymerizing pre-mixed streams of C5/C9 using an appropriate catalyst. However, the inventor has found that sequential monomer addition, forming blocks comprising similar monomer-derived units, is preferred for the synthesis of blocky olefin copolymers with at least two glass transition temperatures. At the selected condition of catalyst and temperature, the "C9 stream" polymerizes in a controlled fashion keeping the chain ends active. At the end of the first stage of polymerization, the C5 or C5/C10 cyclic monomer stream is introduced and the polymer chain continues to grow. The order can be reversed as well.

As used herein "monomer-derived units" or simply "units" are "mer" groups in the polymer backbone derived from a polymerizable monomer. Monomers are reacted with one another to form a polymer comprising monomer-derived units. A polymer may be referred to as having or comprising monomers, meaning that the polymer comprises those monomer-derived units.

Such an olefin block copolymer is a useful tackifying resin in adhesive compositions and/or a component of a film, either as its own layer or a component of a layer in a multi-layered film or sheet. The inventive aliphatic/aromatic olefin block copolymer (or simply "olefin block copolymer") contains at least one aliphatic or "C4-C6 block" (mostly piperylene with other C4-C6 aliphatic olefins) or "C5/C10 block" (mostly dicyclopentadine with other derivatives of cyclopentadiene) and at least one aromatic or "C8-C12 block" (C6-C8 olefins comprising at least one aromatic moiety) which are attached covalently, thus forming micro phase domains. Each individual domain selectively interacts at the interface with appropriate styrenic-based hot melt adhesive or with immiscible multilayer films, thus improving inter-layer adhesion as well as tackifying each block to produce useful adhesives. The use of cyclic C5/C10 stream can also act as a reinforcing and increasing the cohesive strength at high temperature of styrenic-based hot melt adhesives. Herein, a unique approach is disclosed to prepare the olefin block copolymer with two glass transition temperatures using sequential monomer addition.

As used throughout, the olefin block copolymer may be referred to as including at least the two blocks, a C4-C6 olefin block (or "C5 block"), C5/C10 cyclic and a C8-C12 olefin block (or "C9 block"), all of which are covalently bound to one another. The separate C4-C6 polymer may be referred to as a "homopolymer", and the separate C5/C10 cyclic polymer, C8-C12 polymer likewise. The general reaction scheme to produce the olefin block copolymer is shown below, where "a" and "b" are integers and indicate the number of C8-C12 olefin blocks and C4-C6 olefin blocks, respectively, and "A" and "B" indicate both the reactants and stage or step of reaction, which can be in any order. The invention is not limited to the below schematic. For instance, the inventors appreciate that C5/C10 cyclic blocks may also be included in place of either A or B below.

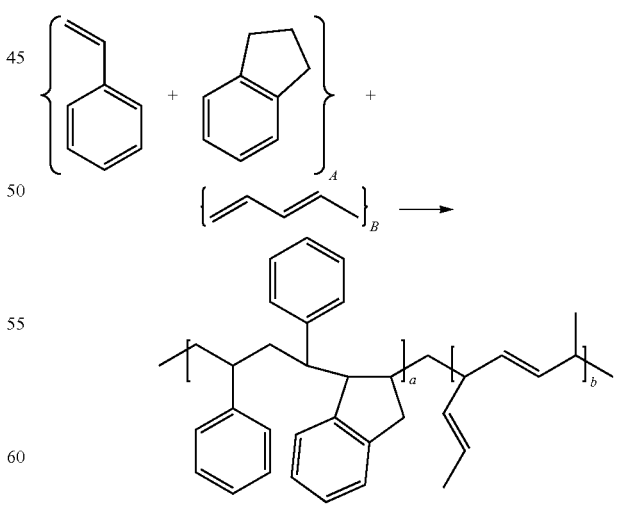

Thus produced is at least an AAABBB type block copolymer. The "a" and "b" integers may range independently from 1, or 2, or 5 to 10, or 20 or more. Note that the reactants (styrene, indene, piperylene) shown here are not exclusive and there may be other reactants, and likewise the identity of each block may vary depending on the amount and/or type of reactants.

In any embodiment, the C8-C12 olefin block(s) described herein comprises units derived from C8-C12 aromatic-containing olefins, wherein at least one of the C8-C12 aromatic-containing olefins comprise at least one aromatic moiety, (A) in the above reaction. An "aromatic-containing olefin" is an olefin comprising at least one aromatic moiety such as indene, methylindene, vinyltoluene, methylstyrene, dicyclopentadiene, naphthalene, and/or styrene. In any embodiment, the C8-C12 olefin block comprises units derived from indene, styrene and combinations thereof. In any embodiment, the C8-C12 olefin block comprises units derived from indene, methylindene, vinyltoluene, methylstyrene, dicyclopentadiene, naphthalene, or styrene, and combinations thereof.

In any embodiment, the C4-C6 olefin block(s) described herein comprises units derived from linear and/or cyclic aliphatic C4-C6 olefins and/or diolefins, (B) in the above reaction. In any embodiment, the C4-C6 olefin block comprises units derived from piperylene. In any embodiment, the C5/C10 cyclic olefin block comprises units derived from cyclopentadiene, dicyclopentadiene, or cyclopentene, and combinations thereof.

In any embodiment, at least 80, or 85, or 90, or 95, or 98 wt % by weight of all units in the C4-C6 olefin block are C4 to C6 olefin- and/or diolefin-derived units; and there may be a minor amount (20, or 15, or 10, or 5, or 2 wt % or less) of units derived from lower (C3 and lower) or higher (C7 and above) olefins and/or diolefins. In any embodiment, at least 80, or 85, or 90, or 95, or 98 wt % by weight of all units in the C8-C12 olefin block are C8 to C12 aromatic-containing olefin-derived units and there may be a minor amount (20, or 15, or 10, or 5, or 2 wt % or less) of units derived from lower (C7 and lower) or higher (C13 and higher) olefins, diolefins and/or aromatic-containing olefin-derived units.

Thus, in any embodiment is a copolymer comprising (or consisting essentially of, or consisting of) at least one block comprising C8-C12 olefin-derived units and at least one block comprising C4-C6 olefin-derived units, wherein each block has a number average molecular weight (Mn) of at least 300, or 400, or 600 g/mole and two glass transition temperatures ($T_g$). In any embodiment, the at least two glass transition temperatures comprise a first $T_{g1}$ and a second $T_{g2}$ as determined by DSC described herein, wherein $T_{g2}$ is greater than $T_{g1}$ by at least 5, or 10, or 20° C., or within a range from 5, or 10, or 20° C. to 30, or 50, or 60° C. In any embodiment, the $T_{g1}$ is within a range from −30, or −20° C. to 40, or 60° C., and $T_{g2}$ is within a range from −10, or 0, or 10° C. to 60, or 80, or 120° C. Unless otherwise stated, values of Tg were determined by the DSC method described herein to a value of ±0.5° C.

The inventive copolymer has certain molecular weight features elucidated by Gel Permeation Chromatograph (GPC). In any embodiment, the at least one C8-C12 olefin block has a number average molecular weight (Mn) within the range from 300, or 400, or 600 g/mole to 1,000, or 2,000, or 3,000, or 4,000, or 6,000, or 10,000, or 20,000 g/mole. In any embodiment, the at least one C8-C12 olefin block has a weight average molecular weight (Mw) within the range from 600, or 800, or 1,000 g/mole to 2,200, or 2,600, or 3,000, or 4,000, or 6,000, or 10,000, or 20,000, or 40,000 g/mole.

In any embodiment, the at least one C4-C6 olefin block has an Mn within the range from 300, or 400, or 600 g/mole to 1,000, or 2,000, or 3,000, or 4,000, or 6,000, or 10,000, or 20,000 g/mole. In any embodiment, the at least one C4-C6 olefin block has a Mw within the range from 600, or 800, or 1,000 g/mole to 2,200, or 2,600, or 3,000, or 4,000, or 6,000, or 10,000, or 20,000, or 40,000 g/mole.

In any embodiment, the at least one C5/C10 cyclic olefin block has an Mn within the range from 300, or 400, or 600 g/mole to 1,000, or 2,000, or 3,000, or 4,000, or 6,000, or 10,000, or 20,000 g/mole. In any embodiment, the at least one C5/C10 cyclic olefin block has a Mw within the range from 600, or 800, or 1,000 g/mole to 2,200, or 2,600, or 3,000, or 4,000, or 6,000, or 10,000, or 20,000, or 40,000 g/mole.

And in any embodiment, the copolymer itself has an Mn within the range from 500, or 800, or 1,000 g/mole to 2,000, or 4,000, or 6,000, or 10,000, or 20,000, or 40,000 g/mole. In any embodiment, the copolymer itself has an Mw within the range from 1,000, or 2,000, or 2,500, or 5,000 g/mole to 6,000, or 8,000, or 10,000, or 30,000, or 40,000, or 60,000, or 80,000 g/mole. In any embodiment, the copolymer as a z-average molecular weight (Mz) within the range from 3,000, or 4,000 g/mole to 16,000, or 20,000, or 40,000, or 60,000, or 80,000, or 100,000 g/mole. The Mz/Mw value of the copolymer is at least 2.0, or 2.2, or 2.4, or 2.8, or 3.0, or within a range from 2.0, or 2.2, or 2.4, or 2.8, or 3.0 to 5, or 6, or 7, or 8, or 10. The Mw/Mn value of the copolymer in any embodiment is at least 1.5, or 1.6, or 1.7, or 1.8; or Mw/Mn is within a range from 1.5, or 1.6, or 1.7, or 1.8 to 2.5, or 3, or 4, or 6, or 8, or 10.

The nature of the copolymer can also be elucidated by Atomic Force Microscopy (AFM) and other means described herein as having "nano-scale" structures or segregation. In any embodiment, the copolymer has discontinuous domains of at least 0.5, or 1, or 2 μm in size, or within a range from 0.5, or 1, or 2 μm to 3, or 4, or 6 μm.

Also disclosed in any embodiment is a method of forming the copolymer described herein comprising (or consisting essentially of, or consisting of) combining C8-C12 olefins with a catalyst in at least a first stage to form a C8-C12 olefin block, and combining C5/C10 cyclic olefins or C4-C6 olefins with the same or different catalyst in at least a second stage to form a C5/C10 cyclic olefins or C4-C6 olefin block; wherein the C5/C10 or C4-C6 olefin block forming stage takes place in the presence of the C8-C12 olefin block, or the C8-C12 olefin block forming stage takes place in the presence of the C5/C10 or C4-C6 olefin block. In any embodiment, the second stage takes place in the presence of the at least one C8-C12 olefin block, or the first stage takes place in the presence of the at least one C5/C10 or C4-C6 olefin block. Thus, the polymerization can take place starting either with the C8-C12 olefin block or the C5/C10 cyclic or C4-C6 olefin block, and preferably takes place in a serial fashion such that the first block(s) to be made are present when the next block is produced, thus forming a series of covalently linked blocks.

In any embodiment, the catalyst is a Lewis Acid catalyst and the components are combined at a temperature within the range from −10, or 0, or 10° C. to 20, or 30, or 40, or 50° C. Categories of useful Lewis acids include those comprising $Al^{3+}$, $Cu^{2+}$, $Fe^{2+}$, $Fe^{3+}$, $Ti^{2+}$, $Sn^{2+}$, and the like, electron deficient compounds including $BF_3$, $AlF_3$, $AlCl_3$, and the like, acids having a central atom having more than 8 valence shell electrons, such as $SiBr_4$, $SiF_4$, and the like, and/or compounds having multiple bonds between two atoms of different electronegativities, such as $CO_2$, $SO_2$, and the like. In any embodiment, the reaction can be a living polymerization reaction, but may also be variants of such reactions. In any embodiment, the reaction may be a so-called "controlled block copolymerization" or a Friedel-Crafts-type reaction, the reaction may also be a controlled anionic polymerization that can be catalyzed by such agents as n-butyl lithium, or controlled cationic polymerization reaction. In any case, the reaction is preferably a continuous polymerization process. The reaction preferably takes place in an aprotic medium, and most preferably in an aliphatic and/or aromatic solvent, such as hexanes and/or toluene. Preferably, there is some residual water moisture present to facilitate the catalytic reaction.

Thus, in any embodiment, a catalyst is combined with olefins comprising indene and/or styrene in one step to form an aromatic C8-C12 olefin block, and in a sequential step the same or different catalyst in the presence of the C8-C12 olefin block (or, at this point, C8-C12 homopolymer) is combined with olefins comprising piperylene to form an aliphatic, or C4-C6 olefin block covalently bonded to the C8-C12 block to form the olefin block copolymer. This can be repeated to increase the number of blocks, for instance, as an AAABBBAAA, or AAABBBAAABBB, etc., block copolymer.

Also in any embodiment, a catalyst is combined with olefins comprising piperylene in one step to form an aliphatic C4-C6 olefin block, and in a sequential step the same or different catalyst in the presence of the C4-C6 olefin block (or, at this point, C4-C6 homopolymer) is combined with olefins comprising indene and/or styrene to form an aromatic, or C8-C12 olefin block covalently bonded to the C4-C6 block to form the olefin block copolymer. This can be repeated to increase the number of blocks for instance, as a BBBAAABBB, or BBBAAABBBAAA, etc. block copolymer.

Also in any embodiment, a catalyst is combined with cyclic olefins comprising cyclopentadiene or dicyclopentadiene in one step to form an C5/C10 olefin block, and in a sequential step the same or different catalyst in the presence of the C5/C10 olefin block (or, at this point, C5/C10 homopolymer) is combined with olefins comprising indene and/or styrene to form an aromatic, or C8-C12 olefin block covalently bonded to the C5/C10 block to form the olefin block copolymer. This can be repeated to increase the number of blocks for instance, as a CCCAAACCC, or CCCAAACCCAAA, etc. block copolymer, where "C" is a C5/C10 cyclic component.

The copolymer described herein is useful in any number of applications and articles such as in single layered films, multi-layered films and as part of an adhesive composition, or tire tread and/or tire sidewall compositions. As applied in tires, the inventive copolymer could independently change the two important parameters of tread: rolling resistance (RR) and wet traction (WT). The inventive tackifier can also be used for improving the cohesive strength at high temperature at the same time improving the tack. The copolymer may desirably include just the olefin block copolymer, but may also include other components from the reaction used to make it, such as side products of C4-C6 homopolymers and/or C5/C10 and/or C8-C12 homopolymers that did not form a block. Thus, in any embodiment, is a composition comprising (or consisting essentially of, or consisting of) the copolymer described herein and a C4-C6 homopolymer, a C8-C12 homopolymer, a C5-C10 homopolymer or combination thereof.

In a particular embodiment is an adhesive composition or multi-layered film comprising the copolymer as described herein. Particularly, preferred compositions are those that comprise the olefin block copolymer with ethylene-vinyl-acetate (EVA), styrene-butadiene rubber (SBR), styrene-isoprene-styrene (SIS) copolymers, and/or styrene-butadiene-styrene copolymers (SBS), and hydrogenated versions of any of these. The olefin block copolymer is preferably present in these compositions to within a range of 0.5, or 1, or 5 wt % to 10, or 20, or 30 wt %, by weight of the composition.

The various descriptive elements and numerical ranges disclosed herein for the inventive olefin block copolymers can be combined with other descriptive elements and numerical ranges to describe the invention(s); further, for a given element, any upper numerical limit can be combined with any lower numerical limit described herein, including the examples in jurisdictions that allow such combinations.

EXAMPLES

The features of the inventions are demonstrated in the following non-limiting examples. First, test methods and experimental procedures are described here.

DSC Measurements.

The following DSC procedure was used to determine the glass transition temperatures ($T_g$) of the dual Tg tackifier. Approximately 6 mg of material was placed in a microliter aluminum sample pan. Due to the amorphous nature of the copolymers and homopolymers described herein, the samples were not annealed. The sample was placed in a differential scanning calorimeter (Perkin Elmer or TA Instrument Thermal Analysis System) and was heated from 23° C. to 120° C. at 10° C./minute and held at 120° C. for 5 minutes. Afterward, the sample was cooled down to −50° C. at 10° C./minute. The sample was held at −50° C. for 5 minutes and then heated from −50° C. to 210° C. at 10° C./minute for a second heating cycle. The $T_g$ was determined in the TA Universal Analysis on the second heating cycle. The "Glass Transition" menu item on the TA Universal Analysis equipment is used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

Gel Permeation Chromatography.

The distribution and the moments of molecular weight (Mw, Mn, Mw/Mn, etc.) were determined by using room temperature (20° C.) Gel Permeation Chromatography equipped using Tosoh EcoSEC HLC-8320GPC w/enclosed Refractive Index (RI) Ultraviolet and (UV) detectors. Four Agilent PLgel of 5 μm 500 Å; 5 μm 500 Å; 5 μm 10E3 Å; 5 μm Mixed-D 10 μm Mixed-B were used in series. Aldrich reagent grade tetrahydrofuran (THF) was used as the mobile phase. A 1 mL sulfur solution per 100 mL solvent was used as internal flow marker. The polymer mixture was filtered through a 0.45 μm Teflon filter and degassed with an online degasser before entering the GPC instrument. The nominal flow rate was 1.0 mL/min and the nominal injection volume is 200 μL. The molecular weight analysis was performed with EcoSEC software.

The concentration (c), at each point in the chromatogram was calculated from the baseline-subtracted IRS broadband signal intensity (I), using the following equation: c=βI, where "β" is the mass constant determined with polystyrene standards. The mass recovery was calculated from the ratio of the integrated area of the concentration chromatography over elution volume and the injection mass which is equal to the pre-determined concentration multiplied by injection loop volume.

The conventional molecular weight was determined by using a polystyrene calibration relationship with the column calibration which is performed with a series of mono-dispersed polystyrene (PS) standards ranging from 400 to 35,000 kg/mole. The molecular weight "M" at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript correspond to the test samples. In this method $a_{PS}$=0.67 and $K_{PS}$=0.000175, "a" and "K" being calculated from a series of empirical formula (T. Sun, P. Brant, R. R. Chance, and W. W. Graessley, 34(19) MACROMOLECULES 6812-6820 (2001)). Specifically, a/K=0.695/0.000579 for polyethylene and 0.705/0.0002288 for polypropylene. All concentrations are expressed in g/cm$^3$, molecular weight is expressed in g/mole, and intrinsic viscosity is expressed in dL/g unless otherwise noted. Values for Mn are ±50 g/mole, for Mw are ±100 g/mole, and for Mz are ±200.

Dynamic Mechanical Thermal Analysis (DMTA).

A strain-controlled rheomether ARES-G2 (TA Instruments) was used for the thermal measurements using parallel plates of 8 mm in diameter. After the sample is equilibrated at 130° C., the temperature is ramped down to −50° C. with a cooling rate of 2° C./min During the temperature ramp, dynamic oscillation is imposed in the sample with a frequency of 1 Hz and strain amplitude of 0.1%. The elastic and viscous moduli (G' and G"), as well as tan δ=G"/G' values are recorded during the test.

NMR Measurements.

500 MHz NMR instrument in TCE-d2 or CDCl$_3$ solvent at 25° C. and 120 scans. NMR data of the olefin block copolymer were measured by dissolving 20±1 mg of sample in 0.7 ml of d-solvents. The samples are dissolved in TCE-d2 in 5 mm NMR tube at 25° C. until the sample was dissolved. There is no standard used. The TCE-d2/CDCl$_3$ presents as a peak at 5.98 or 7.24 ppm and used as the reference peak for the samples.

SAXS/MAXS/WAXS Measurements.

All small- and wide-angle X-ray scattering (SAXS/WAXS) were performed using an SAXSLAB Ganesha 300XL+ instrument. The samples were sandwiched in between two kepton films and mounted on a multi-sample stage holder. All sample data were collected at sample-to-detector positions of 91 mm (WAXS) and 1041 mm (SAXS) and were held in a vacuum to minimize air scatter. The SAXS and WAXS were recorded using a Dectris Pilatus. Sample to detector distance was calibrated using a silver behenate standard. A 0-360° integration was performed on the 2D scattering patterns to yield a 1D I(q) versus q scattering profile.

Atomic Force Microscopy.

Atomic Force Microscopy (AFM) is a morphological imaging technique carried out using an Asylum Research Cypher Atomic Force Microscope. Samples were cryo-microtomed prior to scanning in order to create a smooth surface at −120° C. After microtoming, the samples were purged under N$_2$ in a desiccator before evaluation. Imaging was conducted according to the following: The instrument was tuned to the fundamental (1st) mode of the cantilever, setting the amplitude at 1.0 V and the drive frequency to about 5% below the free-air resonance frequency of the cantilever. If running in multifrequency mode, a higher mode (2nd, 3rd, or 4th, depending on cantilever and holder) was selected, setting the amplitude to 100 mV and the drive frequency on resonance. The setpoint was set to 640 mV, the scan rate to 1 Hz, and the scan angle to 90°. An Asylum Research reference standard (10 microns×10 microns pitch grating×200 nm deep pits) was used for the AFM SQC and X, Y, and Z calibration. The instrument was calibrated to be accurate to within 2% or better of true value for X–Y and within 5% or better for Z. Representative scan sizes were 10×10 μm, 5×5 μm, 1×1 μm and 500×500 nm.

Specific examples of the olefin block copolymer and its synthesis follow. At the selected condition of catalyst and temperature C4-C6 olefins were polymerized in a controlled fashion while keeping the chain ends active. At the end of first stage of polymerization, C8-C12 olefins were introduced and the polymer chain continues to grow in Example 1. The reaction order was reversed in Example 2. At the end of both polymerizations, the reaction was quenched by adding alcohol such as methanol or isopropanol. The two specific examples are discussed herein. The reaction product was characterized by various techniques to elucidate the existence and nature of the olefin block copolymers.

Example 1 (C5 Stream First, Followed by C9 Stream)

The synthesis of a first olefin block copolymer by sequential monomer addition is as follows. The C8-C12 and C4-C6 feeds were dried in molecular sieve before polymerization. The C4-C6 stream was first introduced into the continuous stirred tank reactor (CSTR). The C4-C6 cationic polymerization was initiated in conjunction with residual moisture present in the system and Lewis Acid (AlCl$_3$). The reaction temperature and catalyst concentration was kept at 30° C. and 0.3 wt % of catalyst, for minimizing chain transfer and cyclization. At the end of 3 hours, all the C4-C6 olefins had reacted, and a C8-C12 stream was introduced into the same reactor containing the polymerized C4-C6 olefins, keeping the temperature and the catalyst concentration constant. The reaction was subsequently continued for 2 hours, until all the C8-C12 stream had reacted. At the end of the reaction, the polymerization was quenched with isopropanol. The olefin block copolymer was distilled under nitrogen and steam to remove unreacted olefins and other hydrocarbons.

The olefin block copolymer thus produced was characterized by GPC for molecular weight, $^1$H and $^{13}$C NMR spectroscopy for structural characterization. DSC and DMTA were measured for thermal analysis of the olefin block copolymer. Small angle X-ray scattering and atomic force microscopy was measured to analyze the morphology of the olefin block copolymer. The resulting product, the olefin block copolymer, had an Mn of 1165 g/mole, a Mw of 2078 g/mole, and an Mz of 4148 g/mole, thus having an Mz/Mw of 2.0, and an Mw/Mn of 1.79.

Figure 2:
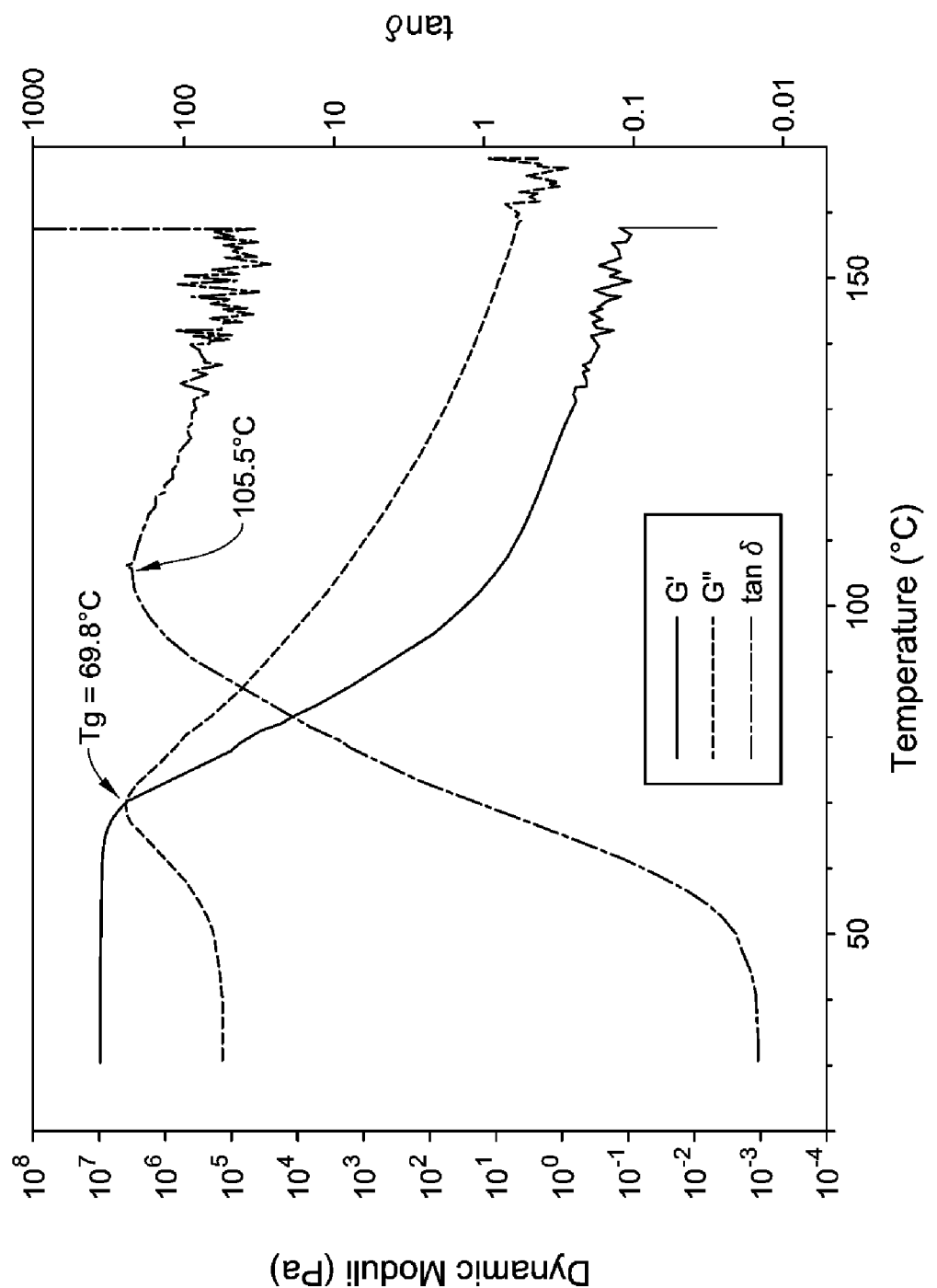
FIG. 2 is a DMTA trace of the inventive olefin block copolymer exemplified in Example 1.

The DSC and DMTA plots in FIG. 1 and FIG. 2, respectively, of the olefin block copolymer of Example 1 exhibits two transitions, the lower transition is at 56° C. (DSC) and 70° C. (DMTA) at the intersection of storage modulus (G') and loss modulus (G") intersection. The higher or second order transition of 105° C. is seen in tan δ peak and is similar in both DSC and DMTA.

Figure 5:
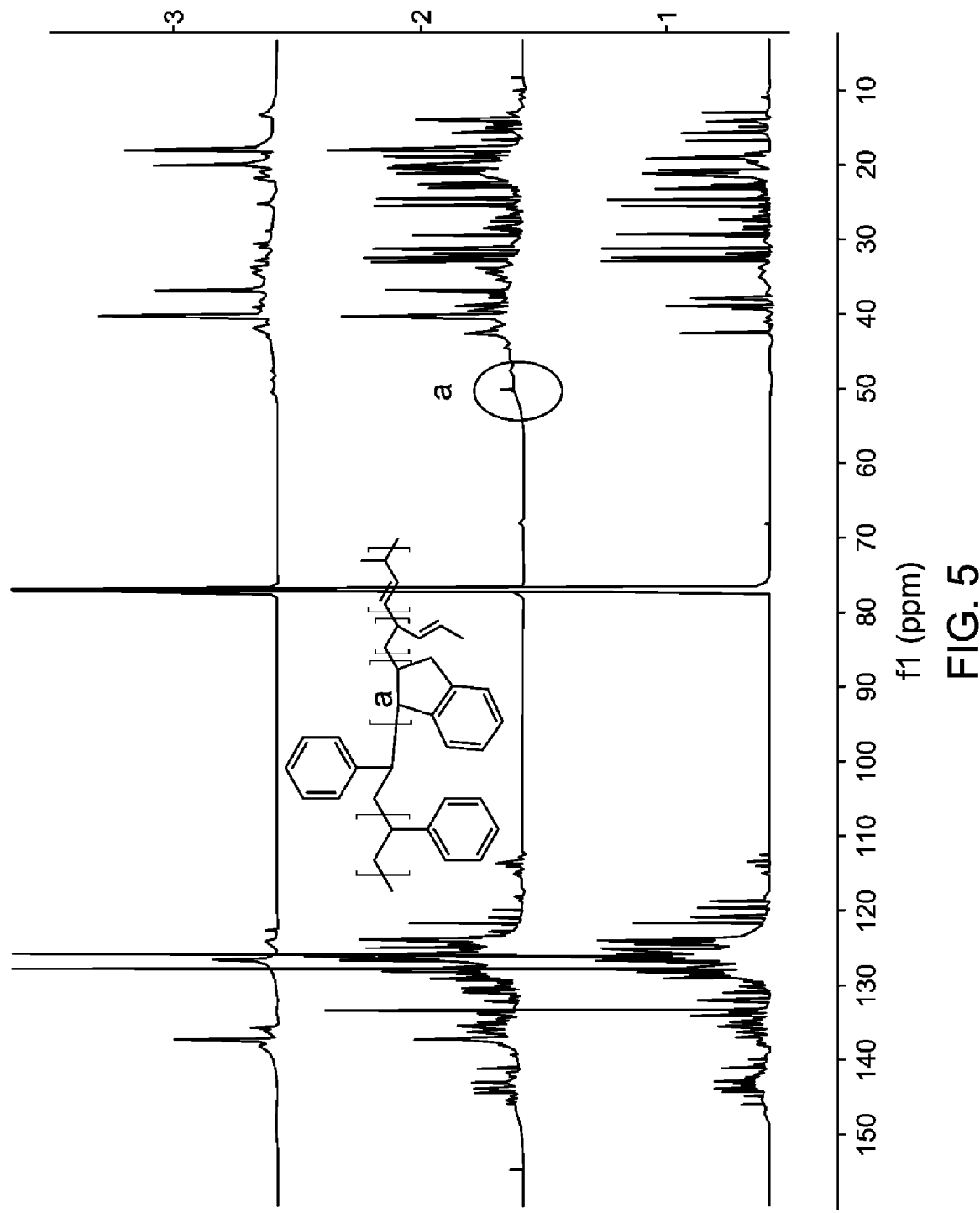
FIG. 5 is a $^{13}$C NMR spectroscopy of the reaction product (center trace) of Example 1, where the top trace is the C4-C homopolymer and the bottom trace is C8-C12 homopolymer trace.

Structural characterization of the olefin block copolymer of Example 1 was carried out by both $^1$H as well as by $^{13}$C NMR spectroscopy techniques. In FIG. 5 are $^{13}$C NMR spectroscopic traces of a C4-C6 homopolymer (top), a C8-C12 homopolymer (bottom), and the reaction product olefin block copolymer poly(C9-b-C5) (middle). The crossover frequencies of $^{13}C$ resonate at a δ of 45 ppm which is buried under the signals of the homopolymer. However, the presence of the next carbon resonance at a δ of 53 ppm suggests cross-over and thus the existence of the block copolymer.

Figure 6:
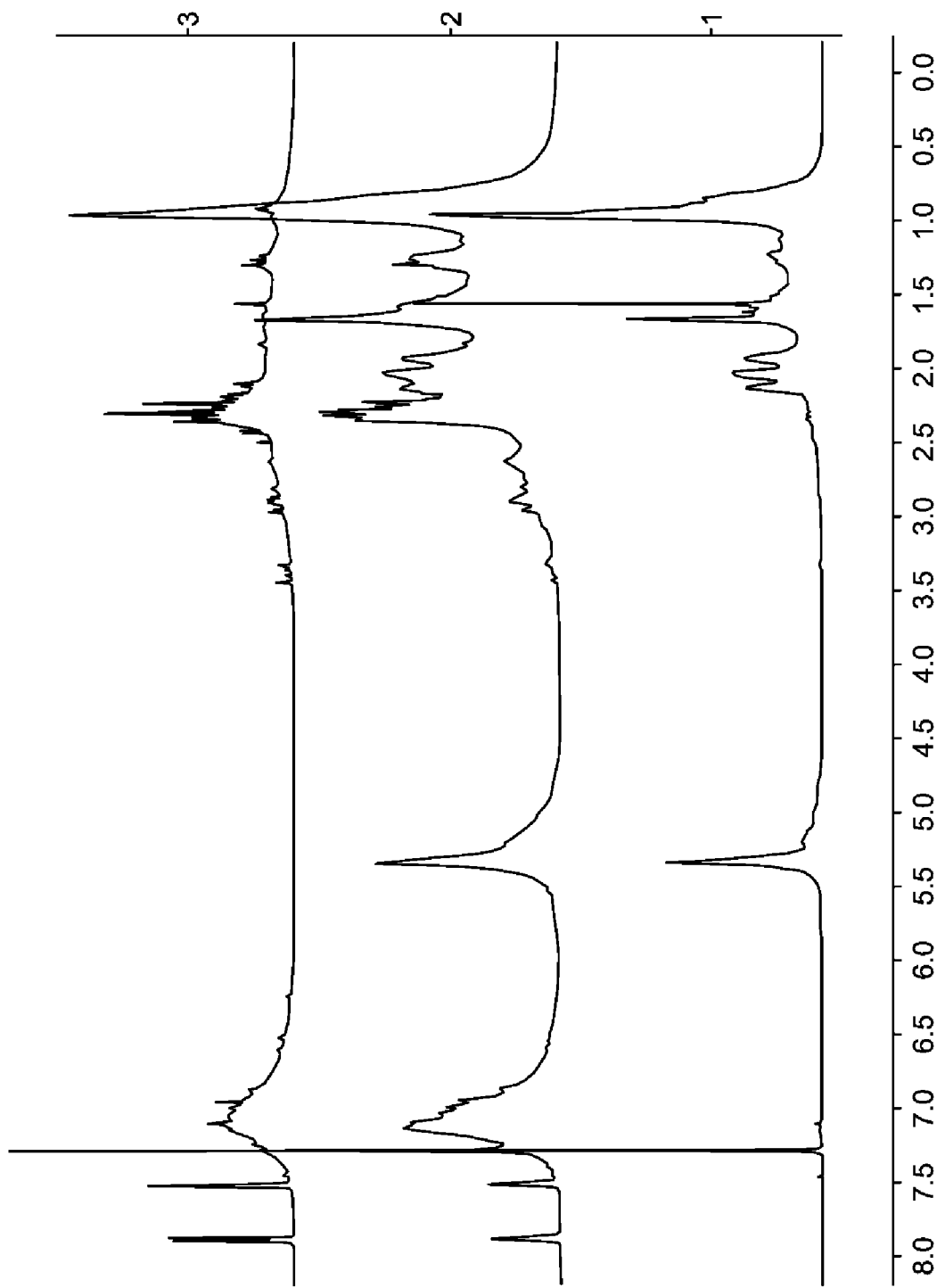
FIG. 6 is a $^{1}$H NMR spectroscopy of the reaction product (center trace) of Example 1, where the top trace is the C8-C12 homopolymer and the bottom trace is C4-C6 homopolymer.

The $^1H$ NMR spectroscopic results for Example 1 are shown in FIG. 6 with traces of a C8-C12 homopolymer (top), a C4-C6 homopolymer (bottom), and the olefin block copolymer poly(C9-b-C5) (middle). From the overall integration of $^1H$ NMR spectroscopy, it is suggested that the composition of the block contains 57 wt % of aliphatic and 43 wt % of aromatic composition. All of the olefinic composition is from the aliphatic C4-C6 monomer units. It was difficult to confirm the cross-over frequency due to the similarity of the $^1H$ NMR spectra with those of the homopolymer blends or mixtures. Thus, from $^1H$ NMR alone, it is not definitive if what is being viewed are two homopolymers or the one olefin block copolymer.

Example 2 (C9 Stream First, Followed by C5 Stream)

The synthesis of a second olefin block copolymer by sequential monomer addition is as follows. The C8-C12 and C4-C6 olefins were dried by passing through molecular sieve before the reactions. The C8-C12 olefin stream was introduced as the first monomer into a CSTR and the polymerization was initiated with the addition of Lewis Acid ($AlCl_3$). The reaction temperature and catalyst concentration was kept at 10° C. and 0.2 wt % of catalyst, for minimizing chain transfer and cyclization. At the end of 3 hours, when all the reactive components of C8-C12 olefins were polymerized, the C4-C6 olefins were introduced as the $2^{nd}$ monomer into the same reactor containing the polymerized C8-C12 olefins. Before the addition of the $2^{nd}$ monomer, the first polymerizable fraction (aliquot) was withdrawn for analysis of the first block. The temperature and the catalyst concentration were kept constant. The reaction was maintained for 2 hours until all the C4-C6 olefins had reacted. At the end of the reaction, the polymerization was quenched with isopropanol. The olefin block copolymer was distilled under nitrogen at 250° C. to remove unreacted hydrocarbons. The amount of C8-C12 and C4-C6 olefins were adjusted in a way that results in 50% of aliphatic and 50% of aromatic composition in the final olefin block copolymer.

The olefin block copolymer thus produced was characterized by GPC for molecular weight, and $^1H$ and $^{13}C$ NMR spectroscopy for structural characterization. DSC and DMTA techniques were used for thermal analysis of the reaction products. The NMR characterization of the olefin block copolymer in Example 2 was consistent with that of Example 1.

From GPC, the number average molecular weight (Mn) of the C8-C12 olefin block from Example 1 was 760 g/mole, and its weight average molecular weight (Mw) was 1820 g/mole, and an Mz of 3400 g/mole. The final olefin block copolymer had a Mn of 953 g/mole, and an Mw of 4611 g/mole, and an Mz of 12,000 g/mole, thus having an Mz/Mw of 2.6, and an Mw/Mn of 4.8.

Figure 3:
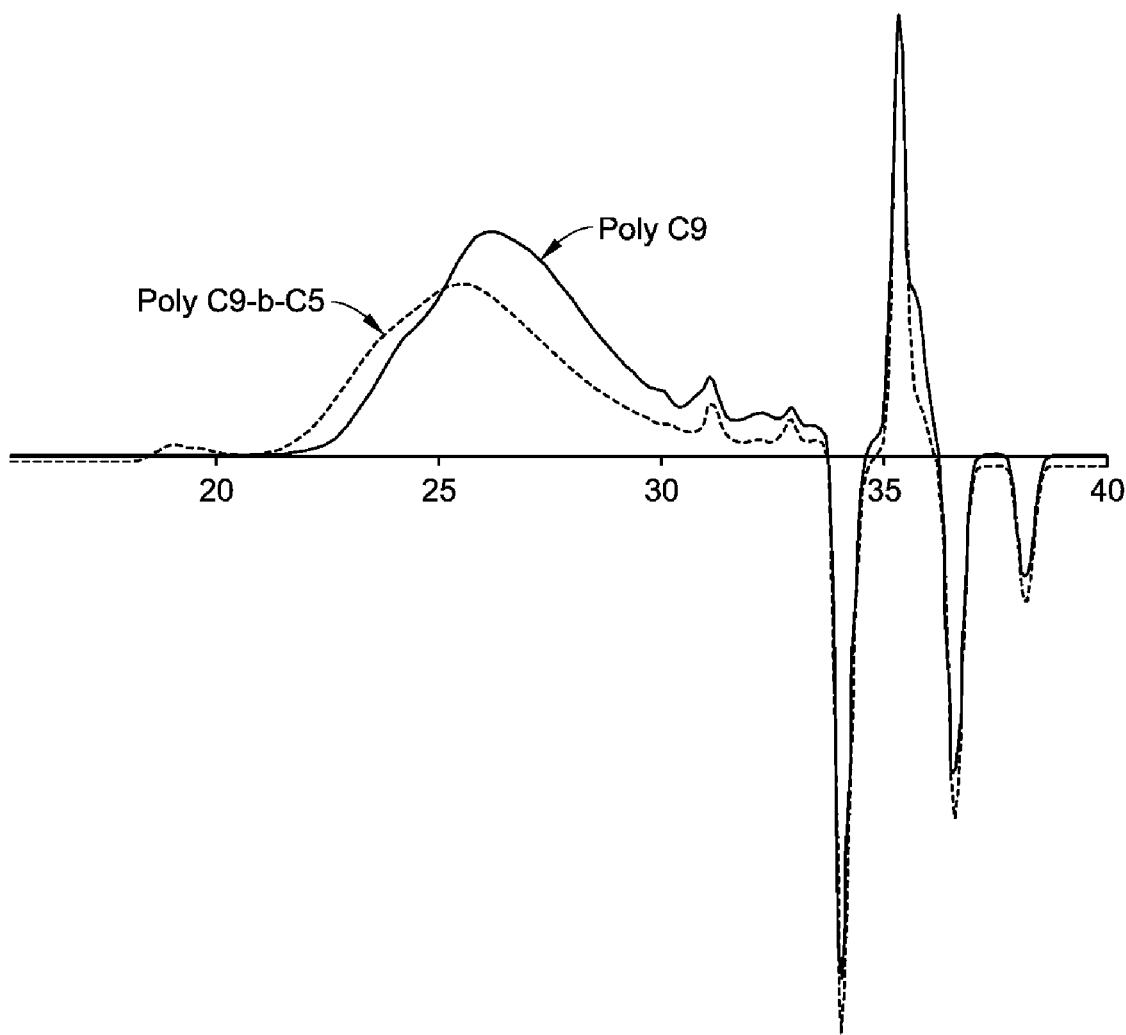
FIG. 3 is a GPC IR trace of the first stage of polymerization in Example 2, generating the C8-C12 olefin block ("C9"), and an overlay trace of the second stage of Example 1 generating the inventive olefin block copolymer.

GPC traces in FIG. 3 are of the precursor (C8-C12 homopolymer) as well as the olefin block copolymer product in Example 2. Both the refractive index (RI) (shown) and the UV (not shown) signals were used to characterize the resin. The first block, which is C8-C12 ("C9"), was UV detectable, whereas the C4-C6 ("C5") was not UV-detectable. The shift in RI-signal with the addition of the 2nd block clearly evidences the change in molecular weight, which is due to the formation of block copolymer. However, in the UV signal there was no change even after the addition of 2nd block, which demonstrates that the numbers of chains with C8-C12 molecules are constant. The C4-C6 olefin block was adding to the already initiated chains from C8-C12, thus forming block copolymers. The volume of the UV trace was increasing which further suggests addition of C4-C12 molecules to the already initiated C8-C12 chains. However, a small hump in the GPC RI trace was observed, which was present after the addition of C4-C12 monomers, which is interpreted as being due to the presence of homopolymer of C4-C12. The GPC analysis provides evidence for a block copolymer of block-C9-C9-C9-block-C5-C5-C5 and some homopolymer of C4-C12.

DSC and DMTA studies for Example 2 were also conducted, including the C8-C12 homopolymer and of the resulting olefin block copolymer reaction product. The DMTA plots of just the C8-12 homopolymer present one big transition in the tan δ peak at 40° C., which correlates with the DSC measurement. The $2^{nd}$ DMTA plot is of the product from the reaction in Example 2 and presents multiple transitions: one at lower temperature, −22° C. (C4-C6 olefin block) and the other at higher temperature 12° C. (C8-C12 olefin block). Both of these transitions are consistent with the DSC measurements of the same reaction product, showing multiple glass transition temperatures. Examination of the tan δ of the olefin block copolymer clearly shows a shoulder at low temperature and a peak at higher temperature. There was also some secondary transition seen in the loss modulus (G″) plot due to the mixture of reactant present in C8-C12 streams such as indene, styrene and derivatives of styrene.

From these data there is evidence that the multiple glass transition temperatures are attributable to an olefin block copolymer and not separate homopolymers. However, further investigation was carried out to prove the existence and "blockiness" of the olefin block copolymer, by performing SAXS and AFM measurements on the olefin block copolymer of Example 2. Preferably, if the olefin block copolymer is a blocky structure, it should phase separate to form micro phase domains at a molecular level.

Figure 4:
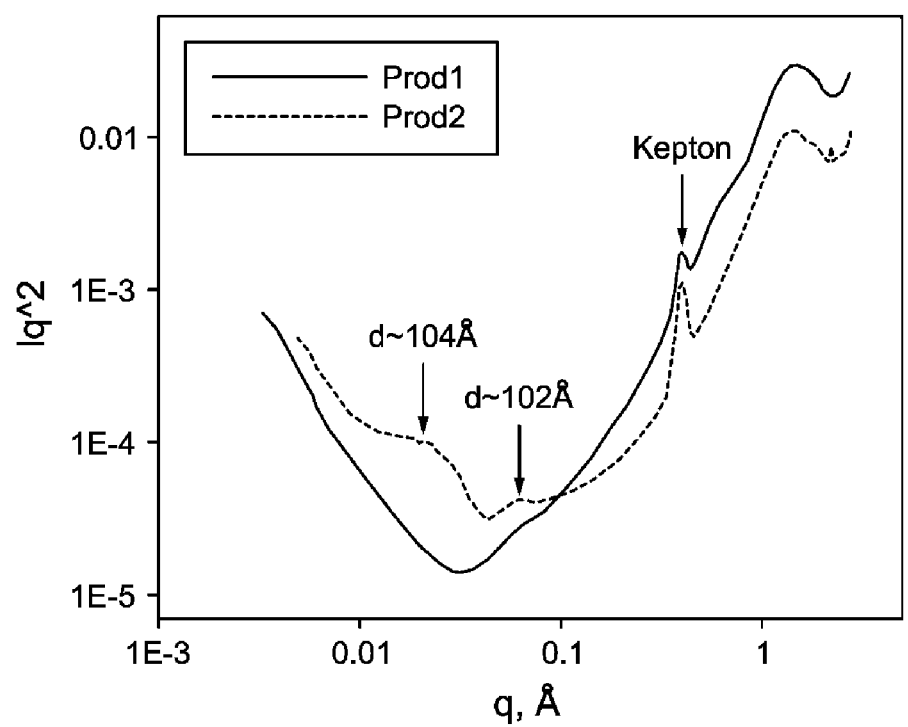
FIG. 4 is an SAXS trace showing the C8-C12 homopolymer spectra ("Prod 1") and the olefin block copolymer spectra ("Prod 2").

SAXS measurements provide evidence that the reaction products of both Examples yield an olefin block copolymer. The scattering patterns were normalized to the primary beam intensity and corrected for background scattering. SAXS from Example 2 (FIG. 4) reaction products display a slope of −4 in the low-q regime, which indicates presence of domains larger than 0.5 microns. The extra shoulder in the intermediate q-regime (0.01 Å−1<q<0.04 Å−1) observed only in olefin block copolymer sample (Prod 2), indicates nano-segregation with characteristic lengths of 20 to 60 nm as opposed to the spectrum of the mixture of homopolymers (Prod 1).

The AFM image height of the Example 2 reaction product evidences the presence of bi-continuous domains of about 50 nm, which correlates with the scattering peak (or shoulder) correspond to the characteristic distance of that structure. The AFM image is consistent with a blocky copolymer composition exhibiting distinct micro phase domains at a molecular level of at least 0.5 μm.

The AFM image and SAXS supports formation of block copolymers. One way to view the block copolymers are as different polymers connected via a covalent bond such that they do not mix, thus the blocks repulse each other and form segregated domains of "nano-scale" structures depending upon molecular weight and chemical nature of each block. In the above case such similar domains are observed in SAXS.

For further characterization of the olefin block copolymers as distinguished from a blend of C8-C12 homopolymer and C4-C6 homopolymer, two-dimensional diffusion-ordered NMR spectroscopy (2D-DOSY) experiments were performed. 2D-DOSY NMR is a valuable technique to distinguish between block copolymers and the polymer blends of their constituents since the translational diffusion coefficient reflect the change in shape and/or size of polymers. DOSY seeks to separate the NMR signals of different species according to their diffusion coefficient. A series of spin echo spectra is measured with different pulsed field gradient strengths, and the signal decays are analyzed to extract a set of diffusion coefficients with which to synthesize the diffusion domain of the DOSY spectrum.

Figure 7:
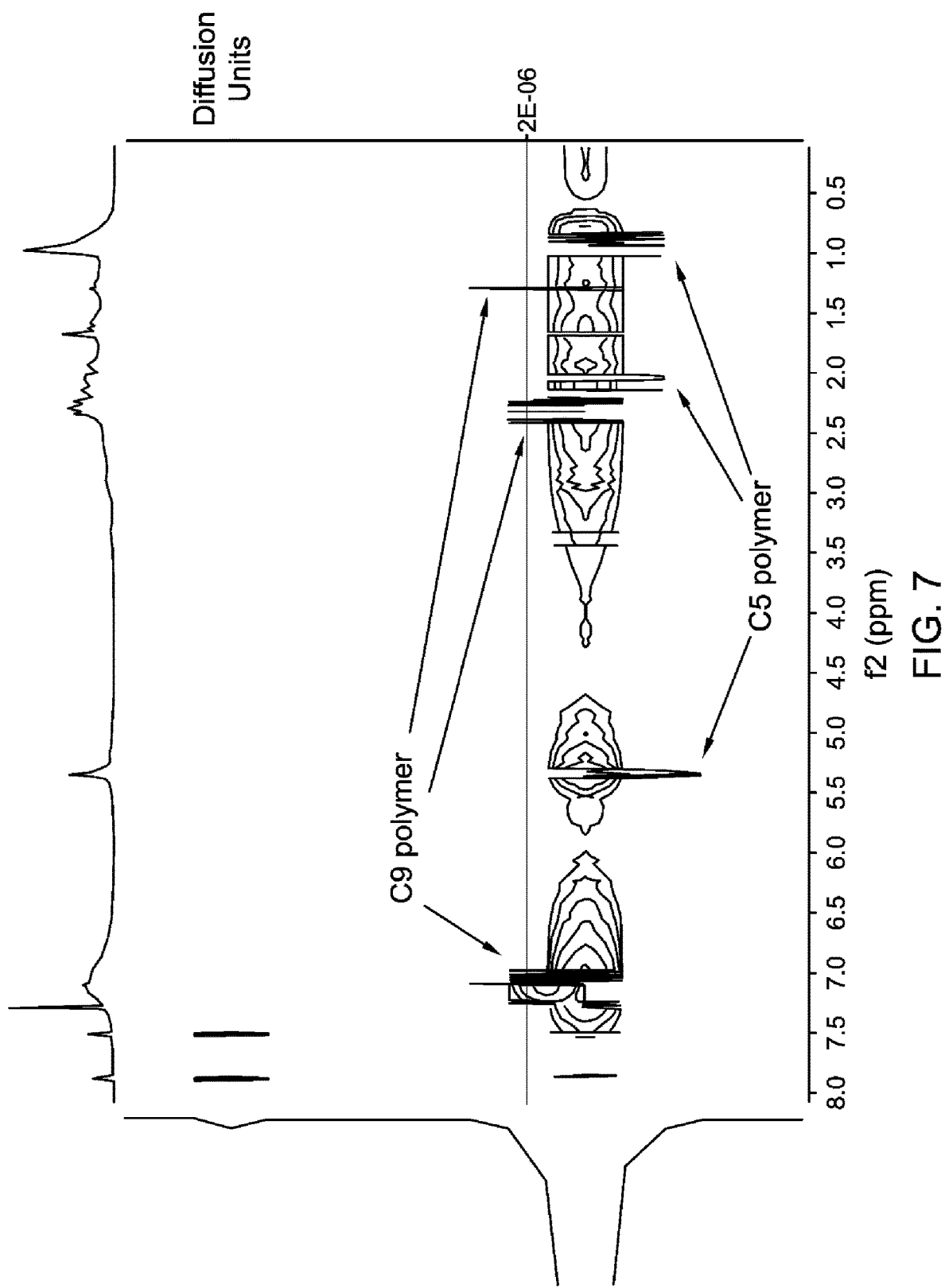
FIG. 7 is a 2-dimensional trace of DOSY NMR spectra of blends of C4-C6 homopolymer and C8-C12 homopolymer.
Figure 8:
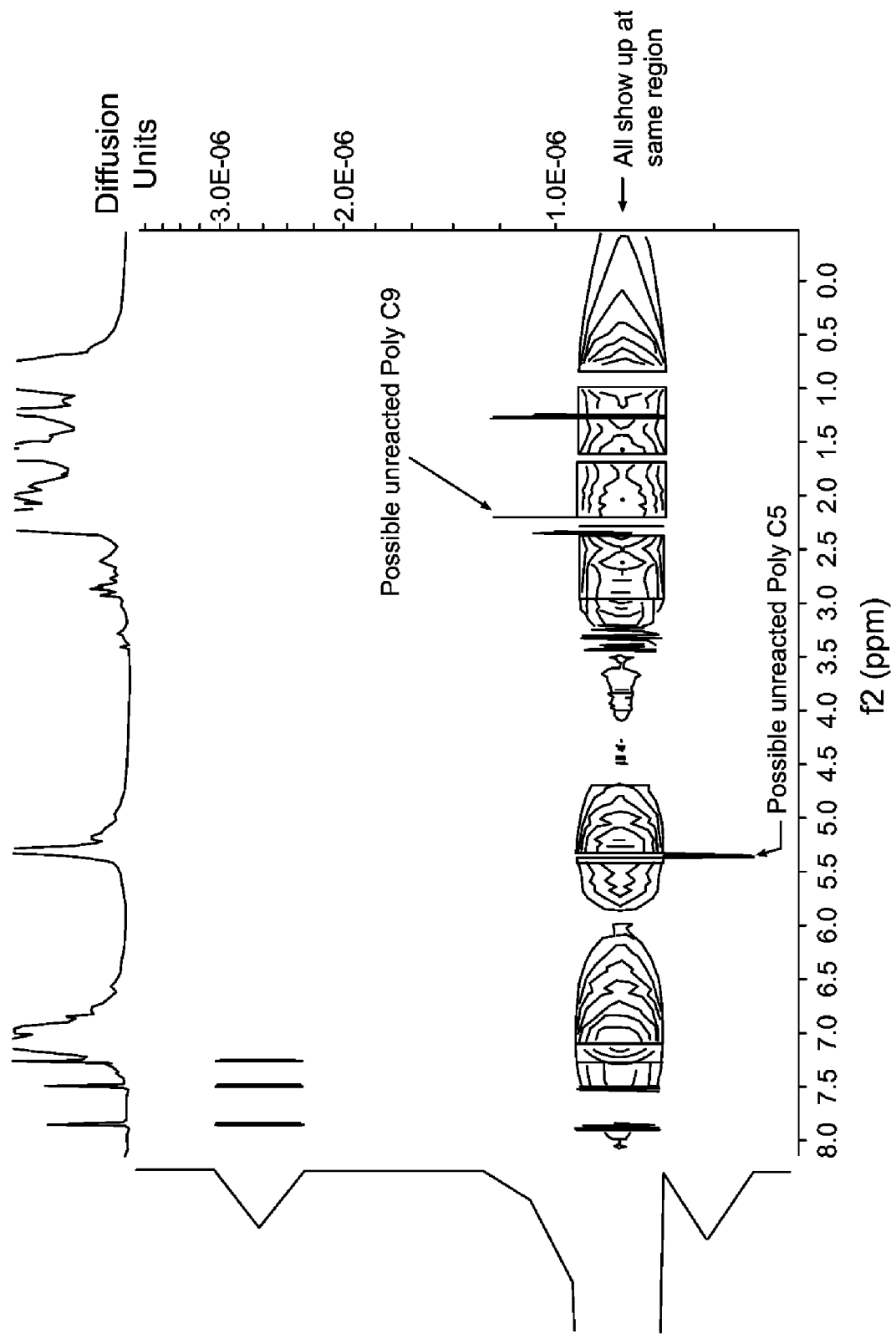
FIG. 8 is a 2-dimensional trace of DOSY NMR spectra of the olefin block copolymer reaction product.

2D-DOSY NMR experiments on a mixture of C8-C12 and C4-C6 homopolymers were carried out and the results shown in FIG. 7, and to the olefin block copolymer reaction product shown in FIG. 8. The composition of the mixture in FIG. 7 was made to be similar to the block-composition deduced from the olefin block copolymer in FIG. 8, where the C8-C12 content was 43 wt % with an Mn of 760 g/mole and Mw of 1820 g/mole; and the C4-C6 content was 57 wt % with an Mn of 2,000 g/mole and an Mw of 14,000 g/mole (as measured by GPC). Since the two individual polymers have different molecular weights and hydrodynamic radii, the NMR resonances in the DOSY spectrum can be identified by careful inspections of the peaks which aligned with a particular diffusion coefficient in the contour plot.

In the case of the olefin block copolymers, all the NMR signals have same attenuation patterns resulting in a single diffusion coefficient since both units—C4-C6 olefin block and C8-C12 olefin block—are present in a single molecule. The data in FIG. 8 indicates that all NMR peaks from the block copolymer appeared parallel to the X-axis with the diffusion coefficient of $8.0 \times 10^{-7}$ m$^2$s$^{-1}$. Although the one-dimensional $^1$H NMR spectra of the polymer mixture and the block copolymer are too similar to be distinguished from each other, the different translational diffusion properties of the polymers ultimately showed up in different diffusion coefficients of each constituent polymer unit.

Additionally, the 2D-DOSY spectroscopy also confirms the presence of some homopolymer of both C4-C6 and C8-C12, which is not the part of the block copolymer. This can be explained by the fact that the system is a controlled polymerization system rather than living polymerization. Hence, some of the chains of first C8-C12 olefin block have terminated and some unwanted chain transfer and termination reactions favor the formation of C4-C6 homopolymer.

Various methodologies demonstrate the preparation of olefin block copolymers using controlled cationic polymerization of C4-C6 and C8-C12 olefins. The olefin block copolymer thus produced has multiple thermal transitions as seen by DSC and DMTA. The GPC, SAXS and 2D-DOSY NMR spectroscopy techniques were used to successfully characterize the olefin block copolymers. These olefin block copolymers find use in styrenic-based block hot melt adhesive or with immiscible multilayer films, thus improving inter-layer adhesion, as well as tackifying each block to produce a useful adhesive.

The olefin block copolymer, when mixed with base polymer as described above, will preferably phase separate in the melt state and will partition at the interface, with the C4-C6 olefin block staying in the aliphatic portion of the base polymer and the C8-C12 olefin block in the aromatic portion of the base polymer. The thermal and flow properties of the base polymer will be influenced also by the weight percent (wt %) of olefin block copolymer in each of the blocks of base polymer. If a prior art random copolymer-type tackifier is used, it typically resides in one of the phases of base polymer, thereby changing the thermal properties of only that block without affecting the other block. The following example of the inventive block copolymer in a blend with a styrene-isoprene-styrene (SIS) tri-block copolymer (Vector™ 4111) demonstrates this when compared to prior art random copolymer type tackifiers.

Example 3 (Olefin Block Copolymer Versus Blends and Commercial Tackifiers)

Blends of 30 wt % of SIS block copolymer Vector™ 4111 (from Dexco), by weight of the blend, were prepared with 70 wt % of the following Escorez™ tackifiers (all from ExxonMobil) described in Table 1 and inventive olefin block copolymer, numbered here as in Table 2: (2) E5400; (3) E5600; (4) mixture of E7105 and E1102; (5) C8-C12 homopolymer; (6) poly(C9-b-C5) (the inventive olefin block copolymer); (7) C8-C12 and C4-C6 homopolymer mixture. Homogenous blends were made by heating the block copolymer and tackifier at 190° C. in a high speed mixer. The polymer blend was cooled and samples were prepared for DMTA measurements described above. Table 2 describes the T$_g$ of each segment as observed in DMTA, and compared with the T$_g$ calculated ("theoretical") using Fox-Flory equation.

TABLE 1

Identification of Commercial Tackifiers and block copolymers used in Example 3.

| Tackifier/Polymer | Description | Source |
|---|---|---|
| Escorez 1102 (E1102) | Aliphatic hydrocarbon resins with typical softening point of 100° C. | ExxonMobil Chemical |
| Escorez 7105 (E7105) | Aromatic hydrocarbon resin with typical softening point of 112° C. | ExxonMobil Chemical |
| Escorez 2520 (E2520) | Liquid Aliphatic/aromatic hydrocarbon resin with typical softening point of 20° C. | ExxonMobil Chemical |
| Escorez 5400 (5400) | Light color fully hydrogenated cyclo-aliphatic hydrocarbon resin having softening point of 103° C. | ExxonMobil Chemical |
| Escorez 5600 (E5600) | Aromatic modified fully hydrogenated cycloaliphatic hydrocarbon resin having softening point of 103° C. and aromaticity of 10 wt % aromatic protons | ExxonMobil Chemical |
| Vector 4111N | styrenic block copolymers are linear triblock copolymers with narrow molecular weight distributions, containing 82 wt % of isoprene and 18 wt % of styrene | Dexco |

TABLE 2

Glass transition temperatures (T$_g$, in ° C.) of each block of the Comparative (C) and Inventive (I) examples as observed in DMTA, and compared with the T$_g$ calculated using the Fox-Flory equation.

| Sample | T$_g$ of components (° C.) | | | Weight % of components (relative to the weight of all components) | | | | Theoretical T$_g$ (° C.) | | Measured T$_g$ (° C.) | | |
|---|---|---|---|---|---|---|---|---|---|---|---|---|
| | Isoprene T$_g$ | Syrene T$_g$ | Tackifier or copolymer T$_g$ | SIS Aliphatic | SIS Aromatic | Mid-block tackifier | End-block tackifier | Midblock T$_g$ | End block T$_g$ | T$_g$ Isoprene | T$_g$ Styrene | T$_g$ Other |
| C 1 | −50 | 100 | — | 24.6 | 5.4 | 0 | 0 | −50 | 100 | −50 | 100 | — |
| C 2 | −50 | 100 | 50 | 24.6 | 5.4 | 70 | — | 1.1 | 100 | −6 | 100 | 50 |
| C 3 | −50 | 100 | 50 | 24.6 | 5.4 | — | 70 | −50 | 52 | −50 | 50 | — |
| C 4 | −50 | 100 | 50/50 | 24.6 | 5.4 | 35 | 35 | 40 | 54 | — | — | 50 |
| C 5 | −50 | 100 | 50 | 24.6 | 5.4 | — | 70 | −50 | 52 | −50 | 70 | — |
| I 6 | −50 | 100 | −22 (Tg$_1$) 12 (Tg$_2$) | 24.6 | 5.4 | 35 | 35 | −29 | 34 | −35 | 30 | — |
| C 7 | −50 | 100 | 50/−10 | 24.6 | 5.4 | 35 | 35 | −15 | 54 | −42 | 83 | — |

Sample 1 is the SIS block copolymer Vector™ 4111 with no tackifier, showing two T$_g$, the first T$_g$ at −50° C. which corresponds to the isoprene phase present in the block copolymer, and the second T$_g$ at 100° C. which corresponds to the hard styrene phase. Commercially available tackifiers are selected in such a way, such as E5400 and E1102, remain in the aliphatic phase of block copolymer (midblock tackifier) whereas others, such as E5600 and E7105 remain in the more polar styrenic phase (end-block).

Sample 2, contains 30 wt % of Vector 4111 and 70 weight % of E5400. Using the Fox-Flory equation, the calculated value of the midblock Tg is 1° C., however, the DMTA showed −6° C. The discrepancy observed can be explained by the fact that not all of the E5400 tackifier migrates to the isoprene phase. There are two transitions observed in the DMTA data of Sample 2, one corresponding to the hard styrene domain (100° C.) and the other minor transition at 50° C. corresponding to E5400, suggesting presence of E5400 as separate phase.

As expected, the Sample 3 DMTA shows that the aromatic E5600 associates with the styrene phase of the SIS block copolymer and changes its T$_g$, which can be seen by comparing the "component" T$_g$ and "measured" T$_g$ values in Table 2. However, the isoprene phase is unaffected.

In Sample 4, the 50/50 mixture of E1102 and E7105 was blended with Vector 4111. Theoretically, the tackifier E1102 would migrate to the rubbery isoprene phase and E7105 into aromatic phase and change the corresponding transitions. However, only one broad transition is seen between 40 to 60° C.

Sample 5 is a blend of the SIS block copolymer with the C8-C12 homopolymer, and as expected, the homopolymer is compatible with the aromatic phase of the polymer and changes its T$_g$ without affecting the T$_g$ of the aliphatic phase.

Sample 6 is a blend of Vector 4111 with the Example 2 olefin block copolymer. In the melt state, it phase separate into different domains. The C4-C6 portion of the olefin block copolymer is compatible with the isoprene block of SIS block copolymer and changes its T$_g$. Similarly, the C8-C12 part of the olefin block copolymer changes the T$_g$ of styrene domain. The theoretical value calculated is in agreement with the measured value.

In the case of physical mixtures of C8-C12 and C4-C6 homopolymers in Sample 7, these are miscible to a certain extent with the base SIS block copolymer. But they don't phase separate as in Example 2. Hence, the predicted T$_g$ doesn't match with that of the measured value. The physical blend is not as effective as changing the flow pattern of base block copolymers.

As used herein, "consisting essentially of" means that the claimed polymer or polymer blend includes only the named components and no additional components that will alter its measured properties by any more than 10 or 20%, and most preferably means that additional components are present to a level of less than 5, or 4, or 3, or 2 wt % by weight of the composition. Such additional components can include, for example, fillers, colorants, antioxidants, anti-UV additives, curatives and cross-linking agents, aliphatic and/or cyclic containing oligomers or polymers, often referred to as hydrocarbon polyethylenes, and other additives well known in the art. As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A copolymer comprising at least one block comprising C8-C12 olefin-derived units and at least one block comprising C4-C6 olefin-derived units and/or C5/C10 cyclic olefin derived units, wherein each block has a number average molecular weight (Mn) of at least 300 g/mole, and the copolymer has two glass transition temperatures (Tg), a number average molecular weight (Mn) of 500 g/mole to 40,000 g/mole, and an Mw/Mn value of at least 1.5; and wherein the C8-C12 olefin-derived units comprise at least one aromatic moiety, wherein the C4-C6 olefin-derived units comprise piperylene and other C4-C6 aliphatic olefins, and wherein the C5/C10 cyclic olefin derived units comprise dicyclopentadiene and other derivatives of cyclopentadiene.

2. The copolymer of claim 1, having a first Tg$_1$ and a second Tg$_2$, wherein Tg$_2$ is greater than Tg$_1$ by at least 5° C.

3. The copolymer of claim 2, wherein Tg$_1$ is within a range from −30° C. to 60° C., and Tg$_2$ is within a range from −10° C. to 120° C.

4. The copolymer of claim 1, wherein the at least one C8-C12 olefin block has a weight average molecular weight (Mw) within the range from 600 g/mole to 40,000 g/mole.

5. The copolymer of claim 1, wherein the at least one C4-C6 olefin block has a weight average molecular weight (Mw) within the range from 600 g/mole to 40,000 g/mole.

6. The copolymer of claim 1, wherein the at least one C5/C10 olefin block has a weight average molecular weight (Mw) within the range from 600 g/mole to 40,000 g/mole.

7. The copolymer of claim 1, having an Mw within the range from 1,000 g/mole to 80,000 g/mole.

8. The copolymer of claim 1, having an Mz/Mw of at least 2.0.

9. The copolymer of claim 1, having discontinuous domains of at least 0.5 µm in size.

10. The copolymer of claim 1, wherein the at least one block comprising C4-C6 olefin-derived units and/or C5/C10 cyclic olefin derived units comprises units derived from linear and cyclic C5/C10 olefins and/or diolefins.

11. The copolymer of claim 1, wherein the C4-C6 olefin block comprises units derived from piperylene.

12. The copolymer of claim 1, wherein the C5/C10 cyclic olefin block comprises units derived from cyclopentadiene, dicyclopentadiene, and derivatives thereof.

13. The copolymer of claim 1, wherein the C8-C12 olefin block comprises units derived from indene, styrene and combinations thereof.

14. The copolymer of claim 1, wherein at least 80 wt %, by weight of all units in the C4-C6 olefin block are C4 to C6 olefin- and/or diolefin-derived units.

15. The copolymer of claim 1, wherein at least 80 wt %, by weight of all units in the C5/C10 cyclic olefin block are C5 or C10 cyclopentadiene or dicyclopentadiene-derived units.

16. The copolymer of claim 1, wherein at least 80 wt %, by weight of all units in the C8-C12 olefin block are C8 to C12 aromatic-containing olefin-derived units.

17. A composition comprising the copolymer of claim 1 and a C4-C6 homopolymer, a C8-C12 homopolymer, C5/C10 cyclic homopolymer, or combination thereof.

18. A method of forming the copolymer of claim 1 comprising combining a first olefin with a catalyst in at least a first stage to form a first olefin block, and combining a second olefin with the same or different catalyst in at least a second stage to form a second olefin block; wherein the first olefin is selected from the group of C4-C6, C5/C10, and C8-C12 olefins and the second olefin is selected from the group of C4-C6, C5/C10, and C8-C12 olefins, wherein the first olefin is not the same as the second olefin.

19. The method of claim 17, wherein the catalyst is a Lewis Acid catalyst and the components are combined at a temperature within the range from −10° C. to 50° C.

20. An adhesive composition or multi-layered film or a polymer composition comprising the copolymer of claim 1.

* * * * *